United States Patent
Van Eeden et al.

(10) Patent No.: US 8,154,387 B2
(45) Date of Patent: Apr. 10, 2012

(54) RFID TAG

(75) Inventors: Hendrik Lodewyk Van Eeden, Pretoria (ZA); Albertus Jacobus Pretorius, Bronkhorstspruit (ZA); Josef Preishuber-Pfluegl, Klagenfurt (AT); Andreas Schuhai, Poertschach (AT); Thierry Roz, Payerne (CH); Christopher Turner, Oakley (GB)

(73) Assignees: EM Microelectronic-Marin SA, Marin (CH); Ipico South Africa (Proprietary) Limited, Pretoria (ZA)

( * ) Notice: Subject to any disclaimer, the term of this patent is extended or adjusted under 35 U.S.C. 154(b) by 483 days.

(21) Appl. No.: 12/442,362

(22) PCT Filed: Sep. 15, 2007

(86) PCT No.: PCT/IB2007/053726
§ 371 (c)(1),
(2), (4) Date: Jun. 30, 2009

(87) PCT Pub. No.: WO2008/035263
PCT Pub. Date: Mar. 27, 2008

(65) Prior Publication Data
US 2010/0026467 A1      Feb. 4, 2010

(30) Foreign Application Priority Data
Sep. 21, 2006   (ZA) .................... 2006/07917

(51) Int. Cl.
*H04Q 5/22* (2006.01)
*G06K 7/00* (2006.01)
(52) U.S. Cl. .................... 340/10.2; 340/10.1; 340/10.5; 235/436
(58) Field of Classification Search ............... 340/10.1, 340/10.2, 10.5, 572.1; 235/375–385, 492, 235/436
See application file for complete search history.

(56) References Cited

U.S. PATENT DOCUMENTS

| 2006/0007049 A1 | 1/2006 | Nitzan et al. |
| 2006/0119470 A1 * | 6/2006 | Breitfuss et al. ............. 340/10.1 |
| 2009/0045923 A1 * | 2/2009 | van Eeden .................. 340/10.3 |
| 2010/0134289 A1 * | 6/2010 | Oh et al. .................... 340/572.1 |

FOREIGN PATENT DOCUMENTS

| WO | 2004/063971 A1 | 7/2004 |
| WO | 2007/096797 A2 | 8/2007 |

* cited by examiner

*Primary Examiner* — Benjamin C Lee
*Assistant Examiner* — Omeed Alizada
(74) *Attorney, Agent, or Firm* — Fitch, Even, Tabin & Flannery, LLP

(57) ABSTRACT

An electronic tag is configured to be responsive to a TTO or TTF protocol energizing signal from a reader, but to suspend transmission when receiving an RTF protocol communication signal from a reader. The tag typically includes a protocol detector 120 which is operable to detect receipt of an RTF protocol communication signal and to suspend transmission when the electronic tag receives an RTF protocol communication signal from a reader.

13 Claims, 2 Drawing Sheets

RFID TAG

THIS INVENTION relates generally to wireless RF (Radio Frequency) communication and particularly to an electronic tag such as an RFID (Radio Frequency Identification) tag.

The Inventor is aware of RF communication systems which include at least one reader, otherwise known as an interrogator, and a plurality of electronic tags, e.g. RFID tags, otherwise known as transponders. The RFID tags are typically passive, being energised by a broadcast signal from the interrogator, but can also be active, having an additional power source like a battery. The passive RFID tags communicate with the interrogator by reflecting a varying amount of energy back to the reader.

The communication between interrogators and RFID tags is regulated by various protocols. There are various different UHF air protocols in use in the world today, for example iP-X, ISO-18000-6A and B, and EPC C1G2 and its Class 1 and Class 0 predecessors.

The EPC C1G2 protocol is a "Reader-Talks-First" (RTF) protocol, i.e. tags do not respond until commanded to do so by the reader using some form of wake up command. In the case of EPC C1G2, the SELECT or QUERY commands are used for this purpose. Thus, RTF tags remain silent until explicitly interrogated by the reader. Typically, the reader first transmits an energising signal to energise the RTF tags. Then the reader may transmit an interrogating signal explicitly to interrogate one or more RTF tags. The RTF tags only transmit back to the reader after receiving an interrogating signal addressed to them.

The iP-X protocol, on the other hand, is a "Tag-Talks-First" (TTF) or "Tag-Talks-Only" (TTO) protocol (for brevity, TTO and TTF protocols are further referred to collectively as TTO protocols), i.e. tags announce themselves when they enter a reader field by transmitting an ID to the reader. This ID transmission typically takes place repeatedly at pseudo-random intervals using a low duty cycle. The transmission of the ID can be followed by transmission of additional data. No additional means to trigger the tag is required. Thus, once the TTO tags receive an energising signal, they automatically begin transmitting to the reader at pseudo-random intervals without receiving a separate interrogating signal.

In some applications or systems, RTF tags and TTO Tags could be located in a common zone or in a common defined volume and can be read by a reader able to detect RTF and TTO tags or be read at different time periods by an RTF reader and a TTO reader. In such applications or systems, the TTO tags can interfere with the communication between the RTF tags and a reader and the presence of the TTO tags can disturb the detection of these RTF tags. Thus, TTO or TTF tags located in an RTF reader field generate a communication problem for an RTF protocol.

According to a broad aspect of the invention, there is provided an electronic tag configured to be responsive to a TTO or TTF protocol energising signal from a reader, but to suspend transmission when receiving an RTF protocol communication signal from a reader.

The electronic tag may thus include means to suspend transmission when receiving an RTF protocol communication signal from a reader. More particularly, the electronic tag may include a protocol detector which is operable to detect receipt of said RTF protocol communication signal and to suspend transmission when the electronic tag receives said RTF protocol communication signal from a reader.

The protocol detector may be operable to suspend transmission indefinitely (e.g. until a temporary power storage of the electronic tag is depleted). Instead, the protocol detector may be operable to suspend transmission for a predefined time period or to alter a duty cycle of the electronic tag.

In one embodiment of the invention, the protocol detector includes a symbol counter and is operable to suspend transmission from the electronic tag for differing amounts of time depending on the nature of the received RTF protocol communication signal.

The protocol detector may be operable, in response to detection of an RTF protocol communication signal comprising a full RTF command, to suspend transmission from the electronic tag for a time period (e.g. 4000 µs) sufficiently long to allow any conventional RTF tags to respond. Further, the protocol detector may be operable, in response to detection of an RTF protocol communication signal comprising only a partial RTF command, to suspend transmission from the electronic tag for a time period (e.g. 100 µs) sufficiently long to allow transmission from an RTF reader of a complete RTF command.

It is to be understood that RTF protocol (e.g. EPC C1G2) signals typically include a signal identifier, for example a pre-amble or a frame sync. Thus, the symbol detector may be operable to detect a pre-amble or frame sync of the RTF protocol communication signal.

In another embodiment, the protocol detector may include a pulse detector. In such case, the protocol detector may be configured to suspend transmission in response to the detection of a number of successive pulses. In one embodiment of the invention, the protocol detector is configured to suspend transmission in response to the detection of five successive pulses, each within 100 µs of its adjacent pulse or pulses.

The protocol detector may be operable to increase the time period for which transmission is suspended in response to detection of a predefined number (e.g. sixteen) of successive pulses.

The electronic tag may be an RFID tag and more particularly may be an RFID TTO tag.

The invention extends to a wireless communication system which includes at least one electronic tag in accordance with the invention as above defined.

The system may further include at least one conventional RTF tag, a reader able to communicate according to an RTF protocol, and a reader able to communicate according to a TTO or TTF protocol.

The reader able to communicate according to an RTF protocol and the reader able to communicate according to a TTO or TTF protocol may be formed by a single reader configured to detect RTF tags as well as TTO or TTF tags. In other words, the system may further include at least one conventional RTF tag and a reader configured to detect RTF tags as well as TTO or TTF tags.

The invention extends further to a method of operating an electronic tag, the method including responding by the electronic tag to a TTO or TTF protocol energising signal but suspending transmission from the electronic tag when an RTF protocol communication signal is being received.

The method may therefore include the prior step of detecting by the electronic tag whether or not an RTF protocol communication signal is being received, before suspending transmission or responding.

The invention will now be further described, by way of example, with reference to the accompanying diagrammatic drawings.

Figure 1:
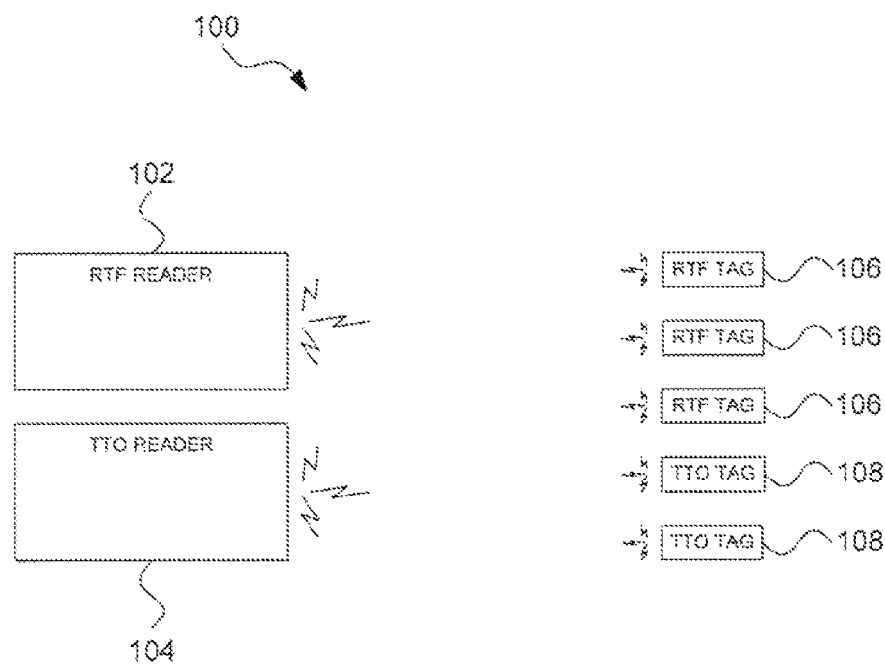
FIG. 1 shows a schematic diagram of a wireless communication system in accordance with the invention.

Referring to FIG. 1, reference numeral 100 generally indicates a wireless communication system in accordance with the invention. The system 100 is shown by way of example to include both an RTF reader 102 and a TTO reader 104, although it is to be understood that the system 100 could include either only an RTF reader 102 or only a TTO reader 104. The system 100 further includes a plurality of electronic tags in the form of RFID tags, specifically RTF tags 106 and TTO tags 108. The wireless communication system 100 is therefore a mixed communication system comprising at least two protocols (RTF and TTO).

The RTF reader 102 is operable, in conventional fashion, to transmit an energising signal and an interrogating signal in an RTF protocol (e.g. EPC C1G2 protocol). The RTF reader 102 is further operable to receive a response signal from one or more RTF tags 106 in response to transmission of the interrogating signal. The system 100 is shown by way of example to include three RTF tags 106, although any number may be included.

The TTO reader 104 is operable to transmit an energising signal (but not an interrogating signal containing particular commands) and to receive a response signal from one or more TTO tags 108 in a TTO protocol (e.g. iP-X protocol). Similarly, the system 100 is shown to include two TTO tags 108, although again any number could be included. Importantly, the TTO tags 108 are RFID tags in accordance with the invention and not conventional TTO tags.

Therefore, each TTO tag 108 is operable to suspend its transmission in response to receipt of an RTF protocol communication signal (e.g. an RTF interrogation command).

In a variant of the system of FIG. 1, the readers 102 and 104 are formed together by a single reader arranged for detecting RTF tags as well as TTO or TTF tags.

Figure 2:
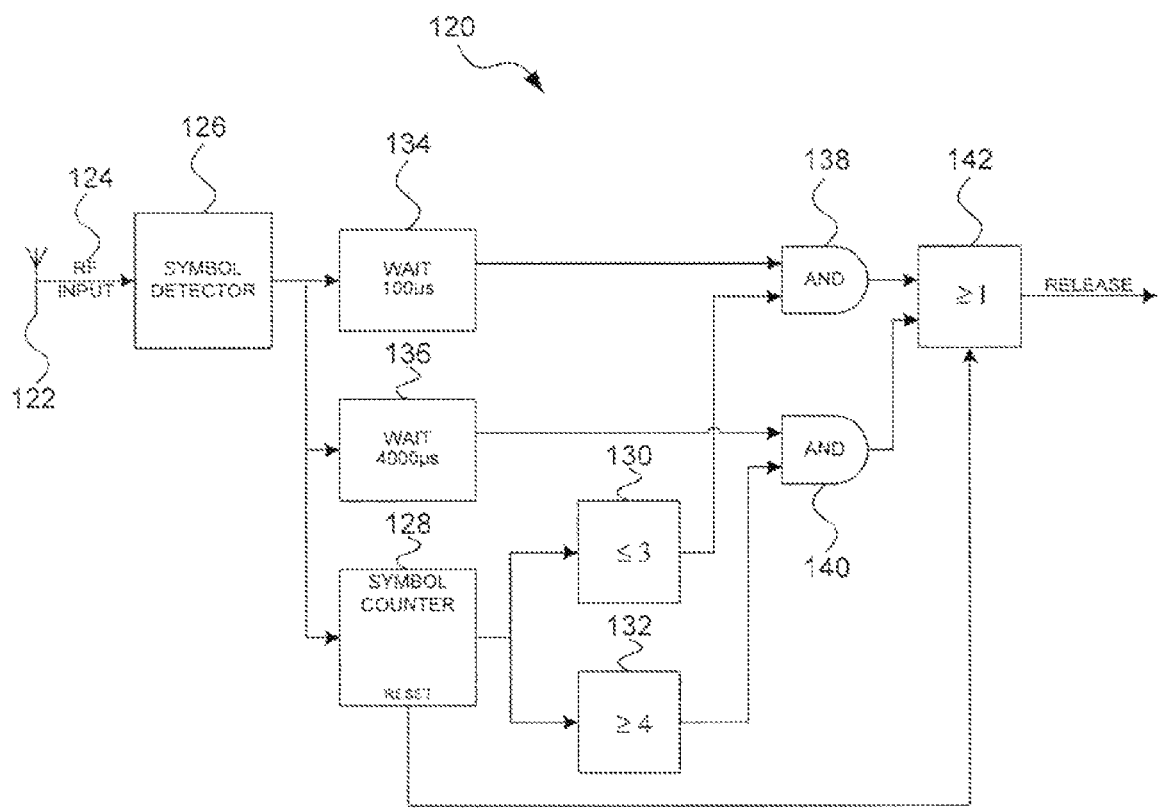
FIG. 2 shows a schematic diagram of a logic circuit of a protocol detector of an RFID tag in accordance with the invention.

Referring now to FIG. 2, reference numeral 120 generally indicates a schematic diagram of a logic circuit of a protocol detector of a TTO tag 108 in accordance with the invention.

The TTO tag 108 includes an antenna 122 in conventional fashion. The antenna 122 is in electrical communication with a symbol detector 126. The antenna 122 is operable to supply the symbol detector 126 with an RF input 124. The RF input 124 is any RF signal which the antenna 122 receives, for example an energising signal or an RTF protocol interrogating signal.

The symbol detector 126 is operable to detect an identifier, for example a preamble or a frame sync (refer further to FIG. 4) or any other command, of an RTF protocol signal. For ease of illustration, this example will be further described with reference to an RTF protocol in the form of the EPC C1G2 protocol (ISO/IEC 18000-6 Type C), but it is to be understood that the invention could be applied to any other RTF protocol, for example all cases of ISO/IEC 18000-6 Type A and Type B.

Figures 3, 4:
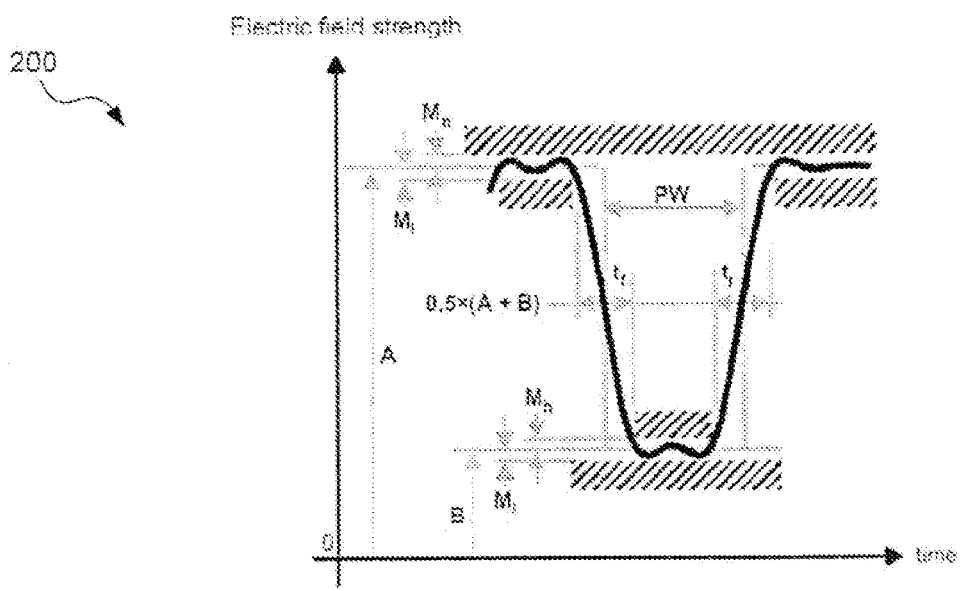
FIG. 3 shows a graphical representation of an envelope of an RF signal of a communication in an EPC C1G2 protocol.
FIG. 4 shows a graphical representation of RTF interrogation signals.

Referring now also to FIG. 3, reference numeral 200 generally indicates an example of an envelope of an RF signal of a communication in an EPC C1G2 protocol. Thus, the symbol detector 126 is operable to detect the rising or falling edges of the envelope of the RF signal 200 (because the envelope of the rise time and the fall time is typically symmetrical), thus to determine whether or not a communication in an EPC C1G2 protocol is received.

Referring now also to FIG. 4, reference numeral 210 generally indicates an example waveform of a preamble of an EPC C1G2 signal transmitted from the reader 102. Reference numeral 220 similarly indicates an example waveform of a frame sync of an EPC C1G2 signal.

However, it is to be understood that a transmission in an EPC C1G2 protocol typically comprises a plurality of symbols. A plurality of symbols comprises a command. The shortest command is called an "acknowledge" command and comprises four symbols. All other commands therefore comprise four or more symbols. Thus, a symbol sequence of less than four symbols is not a command in itself, but could form part of a preamble or a fragment of a valid command.

Therefore, in the illustrated example, the protocol detector 120 includes a symbol counter 128 which is operable to count the number of symbols in a received RF input 124. The symbol counter 128 is thus operable to determine if there are four or more symbols (the RF input 124 therefore constituting a potential command) or three or less symbols (the RF input 124 therefore not constituting a full command). The symbol counter 128 includes two outputs. A first output 130 is asserted when there are three or less symbols while a second output 132 is asserted when there are four or more symbols.

As stated above, RTF tags 106 only respond when specifically commanded to do so. Thus, they only transmit in response to receiving an RF input comprising four or more symbols. It is therefore desirable to suppress transmission from the TTO tag 108 when in transmission range of the RTF reader 102 for differing durations depending on the amount of symbols received in the RF input 124. When the TTO tag 108 receives a communication in an RTF protocol (typically intended only for an RTF tag 106) containing four or more symbols (a command), transmission from the TTO tag 108 is suspended for a longer duration to allow the RTF tag 106 to transmit back to the RTF reader 102 without interference from any TTO tags 108. However, when the TTO tag 108 receives a communication in an RTF protocol containing three or less symbols, this does not constitute a command and therefore any RTF tag 106 which also received the signal will not respond with a transmission. The TTO tag 108 therefore suspends transmission for a shorter duration only to allow for any further symbols to be transmitted from the RTF reader 102. It is to be appreciated that the duration for transmission of a symbol from the RTF reader 102 is considerably shorter than the duration of transmission of a response from the RTF tag 106.

To this end, the protocol detector circuit further includes two counters. A first counter 134 counts to roughly 100 μs, while a second counter 136 counts to roughly 4000 μs (4 ms). The counters 134, 136 may be in the form of mono flop circuits, for example respectively having a six bit counter and a combination of a five bit counter and a six bit counter.

The 100 μs counter 134 is coupled to the first symbol counter output 130 via an AND logic gate 138, while the 4000 μs counter 136 is coupled to the second symbol counter output 132 via another AND logic gate 140. Therefore, in response to receiving an RF input 124 containing three or less symbols, the TTO tag 108 is operable to suspend communication for 100 μs (to allow for transmission of any further symbols by the RTF reader 102). On the other hand, in response to receiving an RF input 124 containing four or more symbols, the TTO tag 108 is operable to suspend communication for 4000 μs, thereby to allow for any potential response transmissions from RTF tags 106 which may have been commanded to respond. The longest symbol of an EPC C1G2 communication together with a tolerance arbitrarily selected to be 10% is 82.5 μs. Suspending communication for 100 μs would therefore allow for at least one further symbol to be transmitted. Similarly, the maximum transmission time of a response from an RTF tag 106 is 3550 μs and suspending communication for 4000 μs therefore allows the RTF reader 102 to receive the response transmission from the RTF tag 106 with out any interference communication from the TTO tag 108.

After the appropriate time (either 100 μs or 4000 μs) has elapsed, a logic gate 142 releases the TTO tag 108 and it is then free to resume its usual communication by transmitting at pseudo-random intervals. Upon receipt of any further EPC C1G2 signal the protocol detector circuit 120 would again be operable to suspend communication from the TTO tag 108.

In use, when the TTO reader 104 transmits an energising signal, all tags within range (RTF tags 106 and TTO tags 108) are energised. The RTF tags 106 do not respond because the TTO reader 104 does not transmit an interrogating command. Thus, the respective protocol detectors 120 of the TTO tags 108 do not detect a communication in an RTF protocol and thus do not suspend transmission from the TTO tags 108. The TTO tags will therefore transmit in conventional fashion at pseudo-random intervals.

Similarly, when the RTF reader 102 transmits an energising signal, all tags within range (RTF tags 106 and TTO tags 108) are energised. However, the RTF reader, in conventional fashion, follows the energising signal transmission with one or more transmissions in RTF (specifically EPC C1G2) protocol. The RTF tags 106 thus respond to the RTF reader 102 when specifically commanded to do so.

The respective protocol detectors 120 of the TTO tags 108 detect the presence of the RTF interrogation signal and suspend any transmission from the TTO tags 108 for either 100 μs or 4000 μs depending on the number of symbols in the RTF signal.

In an alternative embodiment of the invention, the electronic tags 108 include a protocol detector in the form of a simplified pulse detector and pulse counter instead of the protocol detector 120 of FIG. 2. The pulse detector is configured to detect a rising or falling edge of a pulse received by the antenna 122 of the electronic tag 108. The pulse counter detects the number of successive pulses each within 100 μs of their adjacent pulse or pulses. Five or more successive pulses, each within 100 μs of its adjacent pulse(s), constitute a mute sequence and in response to the pulse counter detecting such a mute sequence, transmission from the RFID tag in accordance with the invention is suspended.

By way of explanation, RFID tag systems (e.g. the system 100) are controlled by an un-slotted Aloha mechanism to avoid or minimise collisions. In accordance with this mechanism, conventional RFID tags wait a random amount of time after detecting a transmission before they transmit. Typically, this random amount of time has a minimum value of 100 μs. This implies that if a pulse (representative of a transmission) is received within 100 μs of a previous pulse, the subsequent pulse could not have come from any RFID tags operating the Aloha mechanism as they are bound to wait at least 100 μs. Thus, the pulse must have come from a reader, which will usually be the RTF reader 102. Five successive pulses, each within 100 μs of its adjacent pulse(s), are likely to constitute an RTF command.

In this embodiment, the protocol detector further includes a variable delay counter. The delay counter is initially set to 2046 μs (with a 15% tolerance either way) after power up. Each time the pulse counter detects 16 successive pulses, the delay counter is increased, for example doubled and incremented by one. This delay counter can be configured to have a maximum value which conveniently is not shorter than 101 ms (with a 15% tolerance either way).

The Inventors have found that the TTO tag 108 in accordance with the invention is particularly useful for mixed protocol communications in wireless communications systems. In conventional systems, once TTO tags are powered up, they transmit at pseudo-random intervals which may cause interference with transmissions from RTF tags 106. TTO tags 108 in accordance with the invention suspend transmission in response to detection of an RTF protocol, thereby not interfering with transmissions from proximate RTF tags 106.

The Inventors therefore believe that the invention as exemplified provides a convenient RFID tag which is operable in mixed protocol environments and which reduces interference with other protocols.

The invention claimed is:

1. An electronic tag configured to be responsive to a TTO or TTF protocol energizing signal from a reader, the electronic tag comprising a protocol detector which is operable to detect receipt of an RTF protocol communication signal from an RTF reader and to suspend transmission from the electronic tag in response to receipt by the electronic tag of the RTF protocol communication signal.

2. The electronic tag as claimed in claim 1, wherein the protocol detector is operable to suspend transmission indefinitely.

3. The electronic tag as claimed in claim 1, wherein the protocol detector is operable to suspend transmission for a predefined time period or to alter a duty cycle of the electronic tag.

4. The electronic tag as claimed in claim 3, wherein the protocol detector includes a symbol counter and is operable to suspend transmission from the electronic tag for differing amounts of time depending on the nature of the received RTF protocol communication signal.

5. The electronic tag as claimed in claim 4, wherein the protocol detector is operable, in response to detection of the RTF protocol communication signal comprising a full RTF command, to suspend transmission from the electronic tag for a time period sufficiently long to allow any conventional RTF tags to respond.

6. The electronic tag as claimed in claim 4 wherein the protocol detector is operable, in response to detection of the RTF protocol communication signal comprising only a partial RTF command, to suspend transmission from the electronic tag for a time period sufficiently long to allow transmission from an RTF reader of a complete RTF command.

7. The electronic tag as claimed in claim 4, wherein the protocol detector is operable to detect a pre-amble or frame sync of the RTF protocol communication signal.

8. The electronic tag as claimed in claim 3, wherein the protocol detector includes a pulse detector.

9. The electronic tag as claimed in claim 1, which is an RFID TTO tag.

10. A wireless communication system comprising at least one electronic tag as claimed in claim 1.

11. The wireless communication system as claimed in claim 10, comprising at least one conventional RTF tag, a reader able to communicate according to an RTF protocol, and a reader able to communicate according to a TTO or TTF protocol.

12. The wireless communication system as claimed in claim 11, wherein the reader able to communicate according to the RTF protocol and the reader able to communicate according to the TTO or TTF protocol are formed by a single reader configured to detect RTF tags as well as TTO or TTF tags.

13. A method of operating an electronic tag, the method comprising:

responding by the electronic tag to a TTO or TTF protocol energizing signal and suspending transmission from the electronic tag when an RTF protocol communication signal is being received; and detecting by the electronic tag whether or not an RTF protocol communication signal is being received prior to suspending transmission or responding.

* * * * *